United States Patent
Panati et al.

(10) Patent No.: US 11,463,387 B1
(45) Date of Patent: Oct. 4, 2022

(54) CAPTURING AND UTILIZING CONTEXT DATA IN VIRTUAL ASSISTANT COMMUNICATION SESSIONS

(71) Applicant: FMR LLC, Boston, MA (US)

(72) Inventors: Manikanta Panati, Cary, NC (US); Allen Detmer, Patriot, IN (US); Keith Pepin, Brookline, NH (US); Amanda Bedard, Independence, KY (US); Byung Chun, Kingston, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/384,614

(22) Filed: Jul. 23, 2021

(51) Int. Cl.
*H04L 51/02* (2022.01)
*G06F 3/0484* (2022.01)
*G06F 9/54* (2006.01)
*G06F 9/451* (2018.01)
*H04L 65/1069* (2022.01)

(52) U.S. Cl.
CPC ............ *H04L 51/02* (2013.01); *G06F 3/0484* (2013.01); *G06F 9/453* (2018.02); *G06F 9/542* (2013.01); *H04L 65/1069* (2013.01)

(58) Field of Classification Search
CPC ......... H04L 51/02; G06F 9/453; G06F 9/542; G06F 3/0484
USPC .......................................................... 709/206
See application file for complete search history.

(56) References Cited

U.S. PATENT DOCUMENTS

| 6,446,120 | B1* | 9/2002 | Dantressangle | H04L 43/50 |
| | | | | 714/E11.193 |
| 7,228,278 | B2 | 6/2007 | Nguyen et al. | |
| 10,109,297 | B2 | 10/2018 | Brown et al. | |
| 10,127,224 | B2 | 11/2018 | Deleeuw | |
| 10,313,404 | B2 | 6/2019 | Ein-Gil et al. | |
| 10,452,695 | B2 | 10/2019 | Rodgers | |
| 2003/0132958 | A1* | 7/2003 | Himmel | G06F 21/84 |
| | | | | 715/745 |
| 2014/0279050 | A1 | 9/2014 | Makar et al. | |
| 2016/0094492 | A1* | 3/2016 | Li | H04L 51/04 |
| | | | | 709/206 |
| 2017/0148073 | A1* | 5/2017 | Nomula | G06F 16/957 |

(Continued)

OTHER PUBLICATIONS

"Gathering information with slots," IBM Cloud Docs / Watson Assistant (Managed), retrieved from https://cloud.ibm.com/docs/assistant?topic=assistant-dialog-slots on Feb. 16, 2021, 12 pages.

*Primary Examiner* — Zi Ye (74) *Attorney, Agent, or Firm* — Cesari and McKenna, LLP (57) ABSTRACT

Methods and apparatuses are described for capturing and utilizing context data in virtual assistant communication sessions. A chat-based communication session is established between a virtual assistant application and a remote device. An event manager captures a first data event of the virtual assistant application. A parent software application receives the first data event and selects one or more session context data elements using a callback function of the first data event. The event manager captures a second data event of the parent software application comprising the session context data elements. The virtual assistant receives the second data event and inserts one or more messages comprising the session context data elements from the second data event into the chat-based communication session.

24 Claims, 5 Drawing Sheets

(56) References Cited

U.S. PATENT DOCUMENTS

2018/0131643 A1\* 5/2018 Trufinescu .............. G06F 3/048
2019/0311036 A1\* 10/2019 Shanmugam ........... H04L 51/02

\* cited by examiner

CAPTURING AND UTILIZING CONTEXT DATA IN VIRTUAL ASSISTANT COMMUNICATION SESSIONS

TECHNICAL FIELD

This application relates generally to methods and apparatuses, including computer program products, for capturing and utilizing context data in virtual assistant communication sessions.

BACKGROUND

As computing technology has become commonplace, many users have abandoned the use of live telephone conversations with service agents and representatives to answer questions and resolve issues, in favor of electronic communications such as text-based online chat sessions over the Internet that involve the use of computing devices and related chat-based software. In order to efficiently manage this form of communication, many organizations are turning to automated conversation service software applications (such as virtual assistants and chatbots) to interact with end users intelligently using advanced language processing and data interpretation techniques. Many times, a conversation service software application can either resolve the end user's inquiry altogether or sufficiently identify the intent behind the end user's inquiry so that the chat-based communication session can be routed to a live customer service agent best equipped to handle the end user's request.

However, the aforementioned conversation service software applications often lack robust mechanisms for capturing and storing session context data from a given application that is hosting the conversation service application, which may inform the response provided by the conversation service application and/or live agent. For example, a customer may wish to engage in a live chat session with a customer service representative (CSR) in order to receive an answer to a question that the customer is searching for in the given application. An example might be where a user is searching a company's website for product information and activates a virtual assistant application to connect to a live agent for discussion of product features. Typical virtual assistant applications establish a chat session with the lave agent without providing any context or supporting information to the live agent as to the specific inquiry of the customer-instead relying on the customer to manually type in one or more messages in order to learn about the customer's request. This scenario is inefficient and leads to longer interaction times along with reduced satisfaction of customer experience.

SUMMARY

Therefore, what is needed are improved computerized methods and systems for capturing and utilizing context data in virtual assistant communication sessions. The techniques described herein advantageously provide an application-agnostic mechanism for capture and transfer of application-specific session context information during a specific chat-based communication session, such that a conversation service application such as a virtual assistant application (VA) can be configured to seamlessly capture the session context data elements and automatically provide those data elements to the participants in the chat session-resulting in a more positive end user experience and more efficient execution of the chat session. Furthermore, the methods and systems described herein beneficially result in improved natural language processing of chat messages and corresponding improvement in accuracy of generated responses along with reduced re-prompting of questions to an end user.

The invention, in one aspect, features a computer system for capturing and utilizing context data in virtual assistant communication sessions. The system includes a computing device having a memory that stores computer-executable instructions and a processor that executes the computer-executable instructions. A chat-based communication session is established between a virtual assistant application of the computing device and a remote computing device. The virtual assistant application is associated with a parent software application and each of the virtual assistant application and the parent software application is coupled to an event manager. The event manager captures a first data event generated by the virtual assistant application during the chat-based communication session, the first data event comprising a plurality of attributes including an event type, a payload, and a callback function. The parent software application receives, through monitoring of the event manager, the first data event, where the parent software application is subscribed to receive data events corresponding to the event type of the first data event. The parent software application selects one or more session context data elements using the callback function of the first data event. The event manager captures a second data event generated by the parent software application. The second data event comprises a plurality of attributes including an event type and a payload comprising the retrieved session context data elements. The virtual assistant application receives the second data event, where the virtual assistant application is subscribed to receive data events corresponding to the event type of the second data event. The virtual assistant application inserts one or more messages comprising the session context data elements from the second data event into the chat-based communication session.

The invention, in another aspect, features a computerized method of capturing and utilizing context data in virtual assistant communication sessions. A chat-based communication session is established between a virtual assistant application of the computing device and a remote computing device. The virtual assistant application is associated with a parent software application and each of the virtual assistant application and the parent software application is coupled to an event manager. The event manager captures a first data event generated by the virtual assistant application during the chat-based communication session, the first data event comprising a plurality of attributes including an event type, a payload, and a callback function. The parent software application receives, through monitoring of the event manager, the first data event, where the parent software application is subscribed to receive data events corresponding to the event type of the first data event. The parent software application selects one or more session context data elements using the callback function of the first data event. The event manager captures a second data event generated by the parent software application. The second data event comprises a plurality of attributes including an event type and a payload comprising the retrieved session context data elements. The virtual assistant application receives the second data event, where the virtual assistant application is subscribed to receive data events corresponding to the event type of the second data event. The virtual assistant application inserts one or more messages comprising the session context data elements from the second data event into the chat-based communication session.

Any of the above aspects can include one or more of the following features. In some embodiments, the payload of the first data event comprises an identifier associated with the chat-based communication session. In some embodiments, the parent software application executes the callback function to retrieve the one or more data elements for inclusion in the payload of the second data event. In some embodiments, the attributes of the first data event include a timeout value and the virtual assistant application generates a timeout error when the second data event is not received before the timeout value elapses.

In some embodiments, the virtual assistant application and the event manager are embedded in the parent software application. In some embodiments, the virtual assistant application is a text chat application, the event manager is a JavaScript application, and the parent software application is a browser application. In some embodiments, the virtual assistant application and the event manager are embedded in a webpage of the parent software application.

In some embodiments, the virtual assistant application generates the first data event upon initializing the chat-based communication session. In some embodiments, the virtual assistant application stores the session context data elements received in the second data event in one or more session storage parameters. In some embodiments, the virtual assistant application clears the session storage parameters when the chat-based communication session is closed.

In some embodiments, the first data event and the second data event are configured as part of a session context workflow for the chat-based communication session of the virtual assistant application. In some embodiments, the session context workflow is displayed as a workflow diagram in a graphical user interface on a second computing device and one or more users of the second computing device modify the session content workflow using one or more input devices of the second computing device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
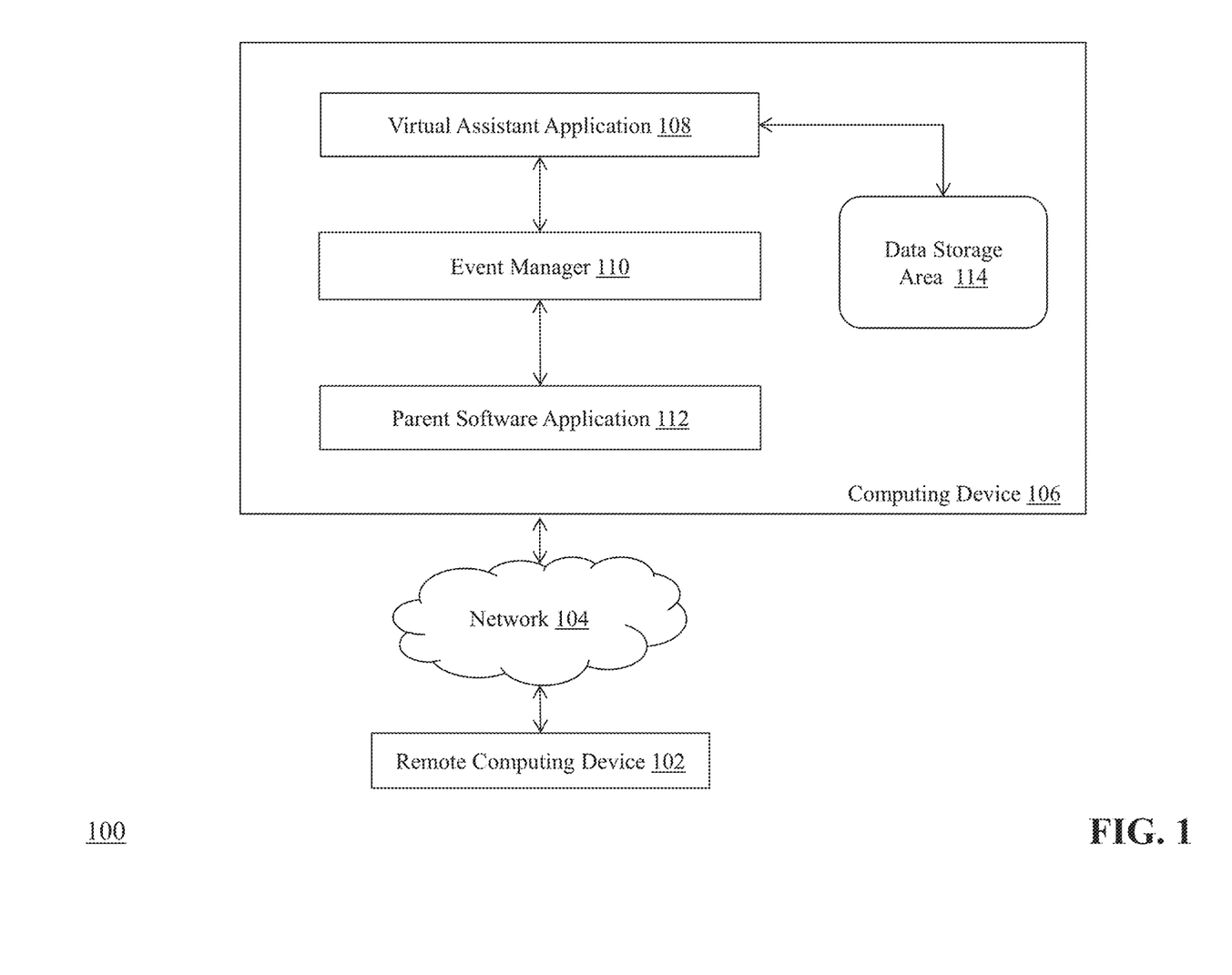
FIG. 1 is a block diagram of a system for capturing and utilizing context data in virtual assistant communication sessions.

FIG. 1 is a block diagram of a system 100 for capturing and utilizing context data in virtual assistant communication sessions. The system 100 includes a remote computing device 102, a communications network 104, a computing device 106 that includes a virtual assistant application 108, a parent software application 110, an event manager 112, and a data storage area 114.

The remote computing device 102 connects to one or more communications networks (e.g., network 104) in order to communicate with the computing device 106 to provide input and receive output relating to one or more chat-based communication sessions as described herein. Exemplary remote computing devices 102 include but are not limited to server computing devices, desktop computers, laptop computers, tablets, mobile devices, smartphones, and the like. It should be appreciated that other types of computing devices that are capable of connecting to the components of the system 100 can be used without departing from the scope of invention. Although FIG. 1 depicts one remote computing device 102, it should be appreciated that the system 100 can include any number of remote computing devices.

In some embodiments, the remote computing device 102 is configured with chat application software, which enables the remote computing device 102 to establish a chat-based communication session with the computing device 106 via the virtual assistant application 108 and/or the parent software application 112 of computing device 106.

The communications network 104 enables the remote computing device 102 to communicate with the computing device 106. The network 104 is typically comprised of one or more wide area networks, such as the Internet and/or a cellular network, and/or local area networks. In some embodiments, the network 104 is comprised of several discrete networks and/or sub-networks (e.g., cellular to Internet).

The computing device 106 is a device including specialized hardware and/or software modules that execute on a processor and interact with memory modules of the computing device 106, to receive data from other components of the system 100, transmit data to other components of the system 100, and perform functions for capturing and utilizing context data in virtual assistant communication sessions as described herein. Exemplary computing devices 106 include but are not limited to desktop computers, laptop computers, tablets, mobile devices, smartphones, and the like. The computing device 106 includes a virtual assistant application 108, a parent software application 110, and an event manager 112 that execute on the processor of the computing device 106. In some embodiments, the modules 108, 110, 112 are specialized sets of computer software instructions programmed onto one or more dedicated processors in the computing device.

As can be appreciated, in some embodiments the virtual assistant application 108 comprises a conversation service software application (i.e. chatbot) configured to automatically interact with a user at computing device 106 in order to gather information and/or respond to inquiries. An exemplary conversation service application can be based upon a natural language processing (NLP) architecture which intelligently parses text messages received from client computing devices to understand the context of the message and how to best respond to it. In some embodiments, the virtual assistant application 108 can establish a chat-based communication session with the remote computing device 102 to enable the user at computing device 106 to participate in a live chat session with a user at the remote computing device 102. In these embodiments, the virtual assistant application 108 provides the chat interface for the exchange of messages between the computing device 106 and remote computing device 102.

The parent software application 110 is an application that executes on the computing device 106 to provide certain functionality to a user of computing device. In some embodiments, the parent software application 110 comprises a native application installed locally on computing device 106. For example, a native application is a software application (also called an 'app') that written with programmatic code designed to interact with an operating system that is native to the computing device 106 and provide information and application functionality to a user of the computing device 106. In the example where the computing device 106 is a mobile device such as a smartphone, the native application software is available for download from, e.g., the Apple® App Store or the Google® Play Store. In some embodiments, the native application includes a software development kit (SDK) module that is executed by a processor of the computing device. In other embodiments, the parent software application 110 is a browser application that runs on the computing device 106 and connects to one or more other computing devices (e.g., web servers, databases, etc.) for retrieval and display of information and application functionality. In one example, the browser application enables the computing device 106 to communicate via HTTP or HTTPS with remote servers addressable with URLs to receive website-related content, including one or more webpages, for rendering in the browser application and presentation on a display device coupled to the computing device 106. Exemplary browser application software includes, but is not limited to, Firefox™, Chrome™, Safari™, and other similar software. The one or more webpages can comprise visual and audio content for display to and interaction with a user.

In some embodiments, the virtual assistant application 108 and the event manager 112 are modules or plug-ins (e.g., Javascript™) that are downloaded from an external source (such as a web server) as part of the rendering of the webpage in the parent software application 110 and upon rendering, the virtual assistant application 108 and the event manager are executed by the parent software application 110 to provide the functionality described herein. For example, the virtual assistant application 108 and the event manager can be embedded or linked in the code of a webpage rendered by the parent software application 110. In some embodiments, the virtual assistant application 108 is executed to render a chat window in the parent software application 110 for conducting a chat-based communication session. In some cases, the chat window is a pop-up window separate from the parent software application 110, while in other cases the chat window is embedded in a webpage displayed by the parent software application.

The virtual assistant application 108 and the parent software application are each coupled to the event manager 112, which comprises a software module configured to manage the publishing and subscribing of data events by other software modules including but not limited to the virtual assistant application 108 and the parent software application 110. In some embodiments, the event manager 112 is a JavaScript™ module that is embedded in a webpage rendered by the parent software application 110. In one example, the event manager 112 code can be part of an SDK that also includes the virtual assistant application 108. When this SDK is loaded by the parent software application 110 that hosts the virtual assistant application 108, the event manager 112 can be exposed as a global object off the browser window object.

Generally, the event manager 112 utilizes a subscription-based paradigm, where other applications 108, 110 are configured to subscribe to specific data events or event types that are made available on the event manager 112 from various sources. When a data event is raised on the event manager, any applications that subscribe to the event/event type receive the data event and perform one or more actions in response to the data event. As will be described herein, the connected applications can also raise data events and publish them to the event manager 112 for consumption by other applications that are subscribed to them, then await responses to the published events. In some embodiments, the applications 108, 110 monitor the event manager 112 (e.g., by listening for certain data events to appear) and invoke specific actions when those data events are detected. In some embodiments, due to its JavaScript framework, the event manager 112 is compatible with any of a plurality of different parent software applications 110 that may host an instance of the virtual assistant application 108.

Although the applications 108, 110 and event manager 112 are shown in FIG. 1 as executing within the same computing device 106, in some embodiments the functionality of the applications 108, 110 and event manager 112 can be distributed among one or a plurality of other computing devices that are coupled to the computing device 106. As shown in FIG. 1, the computing device 106 enables the applications 108, 110 and event manager 112 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The functionality of the applications 108, 110 and event manager 112 will be described in greater detail throughout this specification.

The data storage area 114 is a memory location resident on computing device 106 (or in some embodiments, one or more other computing devices). The data storage area 114 is configured to receive, generate, and store specific segments of data relating to the process of capturing and utilizing context data in virtual assistant communication sessions as described herein. In some embodiments, the data storage area 114 is configured as part of an object resident in the virtual assistant application 108 of computing device 106 that manages the chat session with remote computing devices.

Figure 2:
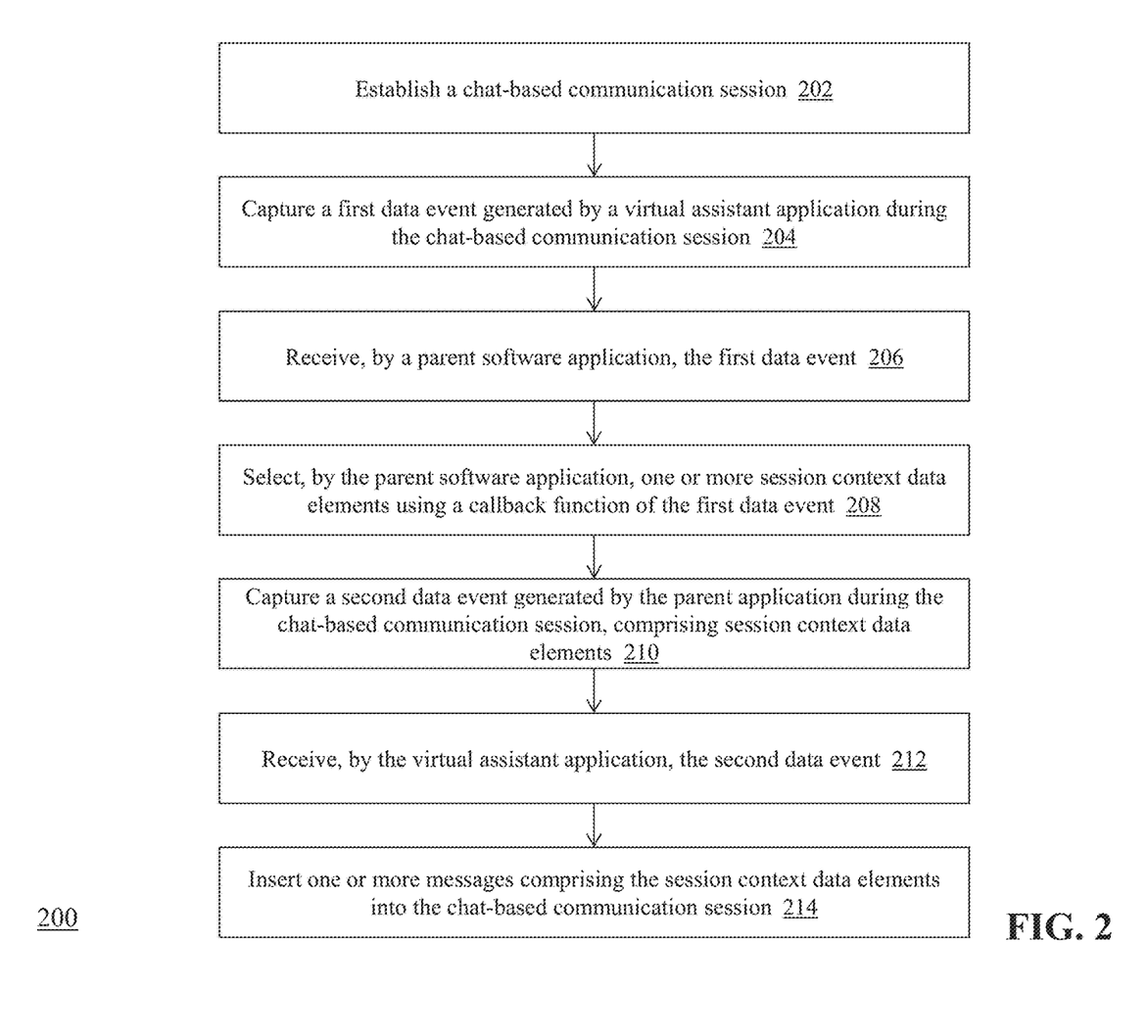
FIG. 2 is a flow diagram of a computerized method of capturing and utilizing context data in virtual assistant communication sessions.

FIG. 2 is a flow diagram of a computerized method 200 of capturing and utilizing context data in virtual assistant communication sessions, using the system 100 of FIG. 1. A user at computing device 106 can launch the parent software application 112 to perform a variety of tasks, including but not limited to information retrieval from local and/or remote data sources. For example, when the parent software application 112 is a browser application, the user can interact with the parent software application 112 to access one or more websites and/or webpages (either internally or externally hosted) in order to view information and submit queries for retrieval of additional information. In one embodiment, the user of computing device 106 is a customer accessing a company website to retrieve information (e.g., product information, account information, customer service information, and the like). In another embodiment, the user of computing device 106 is a customer service representative (CSR) accessing an internal knowledge base/customer support tool in order to look up information in response to a customer query.

As can be appreciated, in some instances the information that the customer or CSR is seeking may not be readily available or the customer/CSR may have additional questions that he or she cannot resolve using only the information provided by the parent software application 112. In these instances, the customer/CSR may want to conduct a chat-based communication session with a remote user (e.g., stationed at remote computing device 102) via the virtual assistant application 108 coupled to or embedded in the parent software application 112. For example, a customer at computing device 106 may want to connect to a CSR at remote computing device 102 for real-time assistance in resolving a problem or answering a questions. In another example, a CSR at computing device 106 may need to escalate an issue to a more experienced support specialist via the virtual assistant application 108. In either example, it would be beneficial for the virtual assistant application 108 to capture specific context data from the parent software application 112 that can be passed on to the remote computing device 102. When received by the user at device 102, the user can analyze the context data to quickly understand the context in which the customer/CSR is contacting them (without requiring a back-and-forth dialog at the beginning to provide context), which results in significantly reduced response times-enabling more efficient allocation of service resources and the ability to provide service to a greater number of inquiries.

Figure 3A:
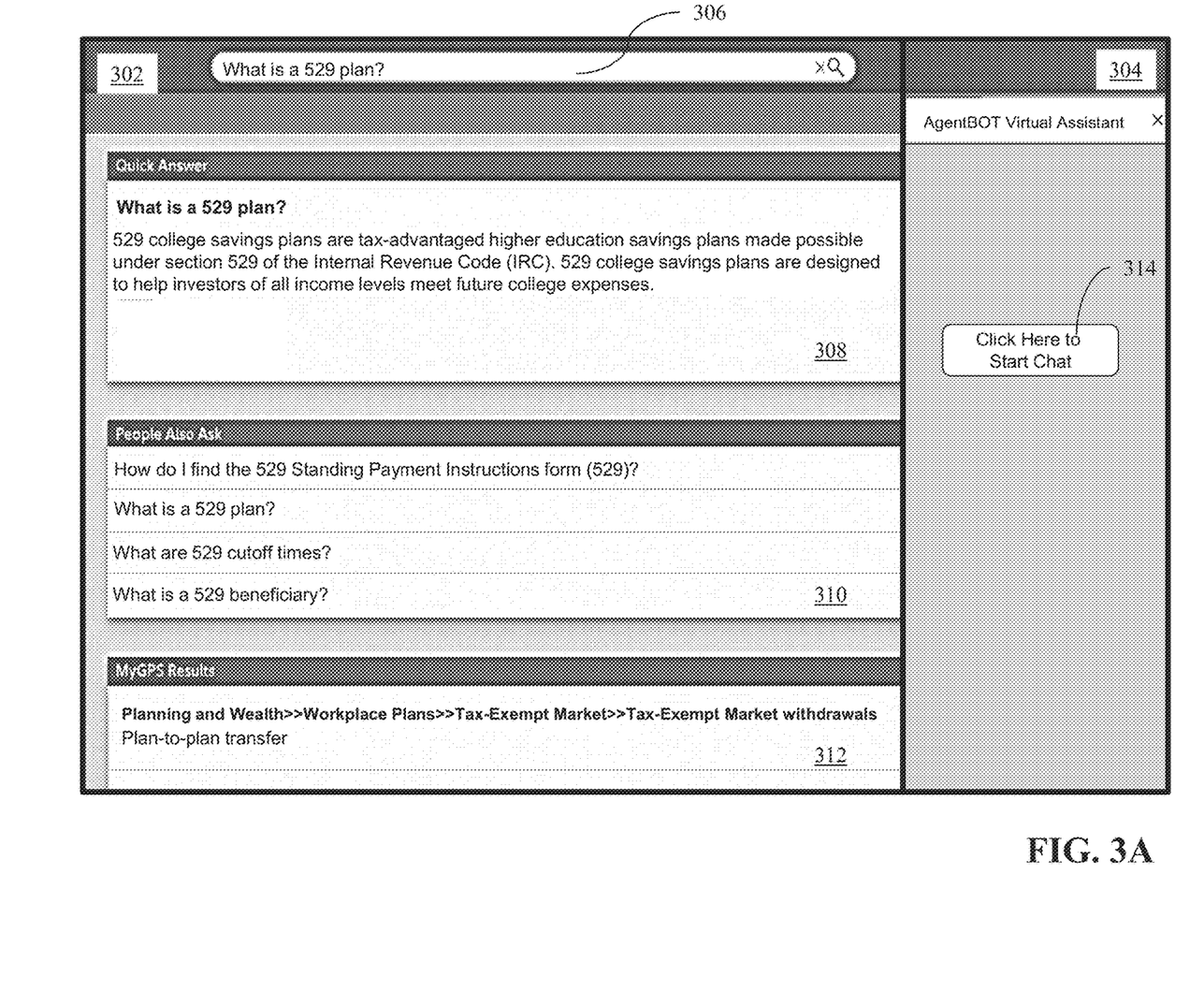
FIGS. 3A and 3B are screenshots of a user interface generated for presentation to a user which shows a parent software application and a virtual assistant application.
Figure 3B:
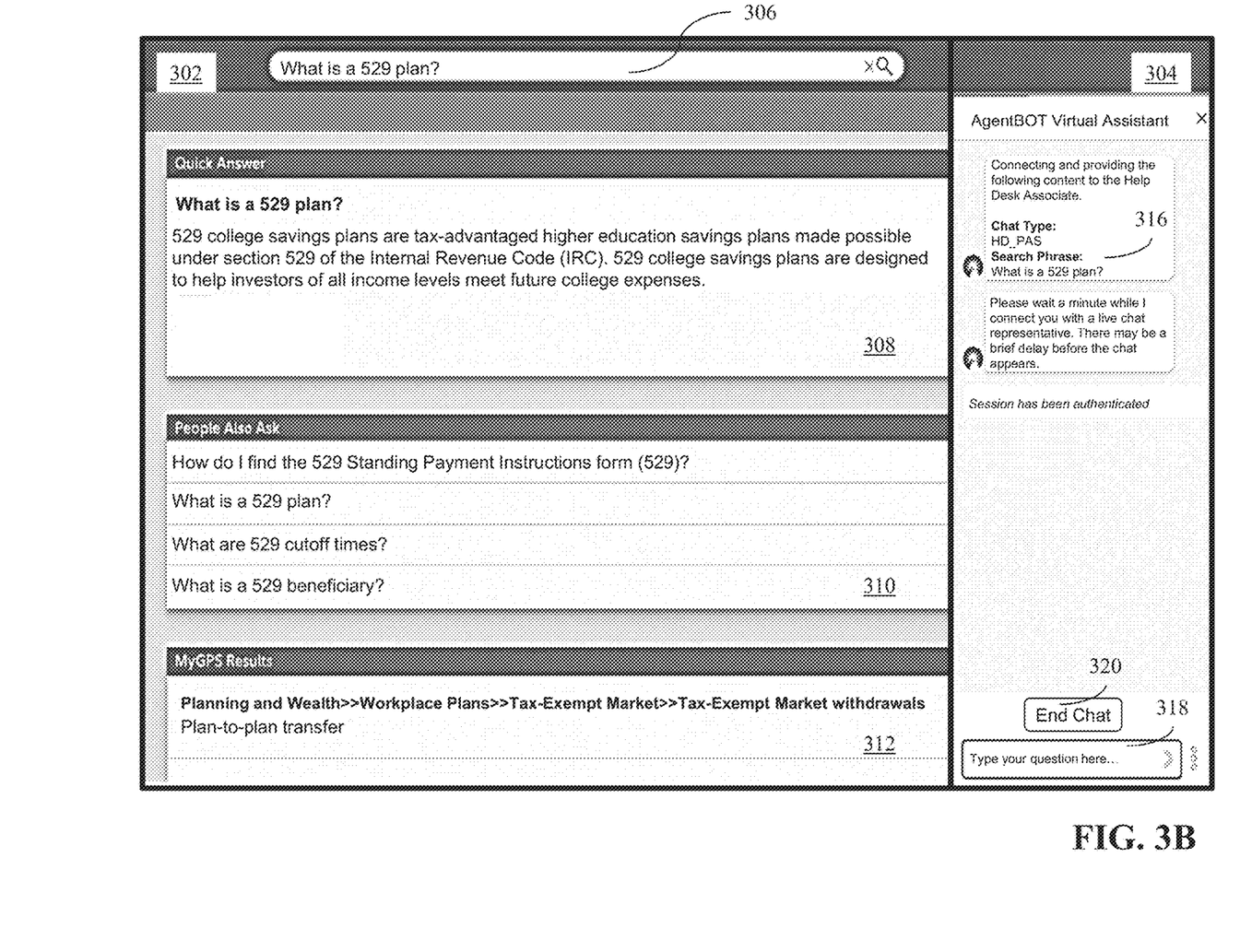

At some point after launching the parent software application 112, the computing device 106 establishes (step 202) a chat-based communication session with remote computing device 102 via the virtual assistant application 108. FIGS. 3A and 3B are screenshots of a user interface generated by the computing device 106 for presentation to a user which shows the parent software application 112 (in region 302 of the user interface) and the virtual assistant application 108 associated thereto (in region 304 of the user interface). In the example shown in FIGS. 3A and 3B, the user at computing device 106 launched the parent software application 112 to look up information about 529 savings plans (e.g., the query "What is a 529 savings plan?" in the search input field 306 at the top of the interface). In response to this query, the parent software application 112 provides certain information (e.g., Quick Answer section 308, People Also Ask section 310, MyGPS Results section 312). However, the user of computing device 106 may need additional assistance in resolving the query. In that instance, the user of computing device 106 can activate the virtual assistant application 108 (e.g., by clicking button 314 in FIG. 3A) to initiate a chat-based communication session with a user at remote computing device 102. In some embodiments, the virtual assistant application 108 is activated upon launching the parent software application 112 and waits for the user to interact with it (e.g., via entering a question in a chat input box or the like) before connecting to the remote computing device 102.

In some embodiments, the event manager 110 is activated and initialized by the computing device 106 when the parent software application 112 and/or the virtual assistant application 108 is activated by the computing device 106. As mentioned above, the event manager 110 can be a component of the parent software application 112 and/or the virtual assistant application 108, or a separate software module that is coupled to the parent software application 112 and the virtual assistant application 108. In some embodiments, the event manager 110 is executed by a processor of the computing device 106 in a background thread or process and does not provide any visual elements displayed in a user interface of the computing device 106. The event manager 110 listens for data events emitted by applications 108, 112 and when a data event is received, the event manager 110 can make the data event available to any applications 108, 112 that are subscribed to receive the event—as will be further explained below.

Turning to FIG. 3B, once the event manager 110 and the virtual assistant application 108 are activated, the event manager 110 captures (step 204) a first data event generated by the virtual assistant application 108 (or in some cases, the parent software application 112) during the chat-based communication session with remote computing device 102. In one example, the virtual assistant application 108 connects to remote computing device 102 and emits a data event corresponding to a request for context data from the parent software application 112. The generation of this first data event by the virtual assistant application 108 can occur immediately upon launching the application 108, upon connecting to the remote computing device 102, or at another point during the chat-based communication session. In some embodiments, the virtual assistant application 108 and/or the parent software application 112 generate a plurality of different data events during the chat-based communication session which are captured and processed by the event manager 110.

To emit a data event, the virtual assistant application 108 can execute a method or function that synchronously raises/fires a named event to the event manager 110 that may be subsequently hooked by the event manager 110. An exemplary method (.emit) shown below includes parameters including, e.g., a string (@param {string} msg) that identifies a type of the emitted data event (i.e. AGENTBOT_GET_VA_CONTEXT) and an optional payload (@param {any=} payload) to be passed with the data event (i.e. conversationId):
let emitter=
window.EventManager.agent('emitter');emitter.emit
('AGENTBOT_GET_VA_CONTEXT', {conversationId: 'fa0f2e23-cc2f-4d0f-b201-a812b411adec'
});

In this example, the conversationId parameter comprises a unique string that identifies the communication session between the remote computing device 102 and the computing device 106.

Another exemplary method for emitting a data event (.invoke) shown below includes the above msg and payload, but includes two additional parameters: callback and timeout. The callback parameter identifies a callback function to be invoked by the application that receives the data event. Typically, the callback function causes the receiving application to execute certain functionality (e.g., data retrieval) and generate a responsive event when the callback function is complete. The timeout parameter contains a value (e.g., in milliseconds) for the emitting application to wait before timing out. In the event of a timeout, the transmitting application can generate an error message and reject the responsive event issued by the receiving application:
let emitter=window.EventManager.agent('emitter');
emitter.invoke({
   message: 'AGENTBOT_GET_VA_CONTEXT',
   callback: ( )=>{
    ...
    //callback functionality
    ...
   },

```
payload: {
    conversationId:         'fa0f2e23-cc2f-4d0f-b201-
       a812b411adec'
    },
    timeout: 5000
});
```

The event manager 110 listens for these and other data events to be emitted by the virtual assistant application 108 and captures the data events (e.g., using a listener or hooking function). The event manager 110 determines one or more applications, such as the parent software application 112, which are subscribed to receive the captured data event(s). For example, the event manager 110 can maintain a register of applications and their associated subscriptions that is referenced when a data event is captured. In the above example, the parent software application 112 can be subscribed to receive data events with the type AGENTBOT_GET_VA_CONTEXT—thus, when a data event with this type is captured, the event manager 110 transmits the data event to the parent software application 112 (or in some embodiments, the parent software application 112 detects availability of the data event at the event manager 110 and retrieves it. As mentioned above, in some embodiments the event manager 110 does not rely on any specific programmatic framework but can be written and configured in a way to be compatible with any type of application (e.g., 112) that may host or otherwise connect to an instance of the virtual assistant application 108. Using the virtual assistant SDK, any application can interface with the event manager and virtual assistant application in order to take advantage of the functionality described herein.

Continuing with FIG. 2, the parent software application receives (step 206) the first data event. As described above, receipt of the data event can be accomplished using a variety of different techniques. In one example, the parent software application 112 can synchronously subscribe to a given named event when emitted by another application using a specified method (.on), as shown below.

```
let receiver=
window.EventManager.agent('receiver');receiver.on
('AGENTBOT_GET_VA_CONTEXT', (payload)=>{
    console.log('Conversation Id:', payload.conversationId);
});
```

The on method enables the parent software application 112 to immediately receive data events of the corresponding type from the event manager 110.

It should be appreciated that the virtual assistant application 108 can be configured to raise a number of other event types for specific situations, as shown in Table 1 below:

The above list is not exhaustive, and other types of data events can be included within the scope of the technology described herein.

Once a data event is received by the parent software application 112, the parent software application can execute functionality to respond to the data event. For example, if the data event is of type AGENTBOT_GET_VA_CONTEXT, the parent software application can retrieve one or more data elements from the application (including, but not limited to, the user interface and/or the metadata of the application) that relate to the context of the application. The parent software application 112 selects (step 208) one or more session context data elements using a callback function of the first data event. Using the example of FIG. 3B, the parent software application 112 can execute the callback function to retrieve the search string (i.e. "What is a 529 plan?" as entered by the user in input box 306) and insert the search string into the payload of a responsive data event that is then made available to the event manager 110. The parent software application 112 and/or the callback function can be configured to select any number of different data elements associated with the parent software application and/or the virtual assistant application to comprise the 'session context'—including data elements that are not visible to the user (e.g., timestamps, network addresses, tags or identifiers embedded in code of a webpage, etc.) that helps inform the virtual assistant application and/or a user of remote computing device 102 as to the context of the parent application 112.

In another example, the data event can be of type VA_EVENT_CHAT_ACTIVE, which indicates that the chat-based communication session has been established between the computing device 106 and the remote computing device 102. The virtual assistant application 108 can fire this data event to the event manager 110, and the parent software application 112 can be configured to subscribe to this event type. Upon detecting the data event, the parent software application 112 can execute certain functionality relating to the confirmation that the chat session has started-such as activating or deactivating user interface elements, performing data retrieval or communications with one or more other computing devices, preparing context data to be shared with the virtual assistant application 108, and the like. It should be appreciated that any number of different actions, including but not limited to, data retrieval can be performed after detection of a particular data event. Also, certain data events do not require a response but instead

TABLE 1

| Data Event Name | Description | Payload |
| --- | --- | --- |
| VA_EVENT_CHAT_ACTIVE | raised when a Live Chat becomes active | N/A |
| VA_EVENT_CHAT_CANCELLED | raised when a Live Chat is cancelled | N/A |
| VA_EVENT_CHAT_ENDED | raised at the end of a Live Chat session | N/A |
| VA_EVENT_EXPANDED | raised when the virtual assistant application (VA) is expanded | N/A |
| VA_EVENT_MINIMIZED | raised when the VA is minimized | N/A |
| VA_EVENT_NOTIFICATION | raised when the parent software application sends back a notification | string detailing the type of notification |
| VA_EVENT_SAVE_SESSION_DATA | raised to trigger saving data to data storage area | data to be saved | cause receiving applications to execute functionality without providing a defined response back to the application that issued the data event.

Once the data elements are collected by the parent software application 112 in response to the first data event, the parent application generates a second data event that comprises a payload that includes the collected session context data elements and makes the second data event available to the event manager 110. For example, the second data event can have a separate event type (e.g., AGENTBOT_RETURN_VA_CONTEXT) or in some embodiments, the second data event shares the event type of the first data event and includes an indicator (e.g., flag) that denotes the second data event is associated with the first data event (e.g., as a response to the first data event). In some embodiments, the parent software application can store the session context data elements in the data storage area 114 (e.g., as session storage parameters). The second data event can include references to the data storage area 114 in addition to or instead of the session context data elements themselves. Then, the virtual assistant application 108 can retrieve the session context data elements from the data storage area 114. The contents of the data storage area 114 can persist throughout the entire chat session or be cleared after each interaction. Also, when the chat session is terminated, the data storage area 114 can be cleared for the next use. Each chat-based communication session can have its own data storage area 114 allocated for use.

The event manager 110 captures (step 210) the second data event generated by the parent software application 112 during the chat-based communication session and determines one or more other applications (e.g., the virtual assistant application 108) that are subscribed to the event type. In some embodiments, the event manager 110 detects the indicator mentioned previously and determines that the second data event is responsive to the first data event as issued from the virtual assistant application 108. The event manager 110 then makes the second data event available for capturing by the virtual assistant application 108 and/or transmits the second data event to the virtual assistant application.

The virtual assistant application 108 receives (step 212) the responsive second data event from the event manager 110 (based upon a subscription to receiving such data events and/or by virtue of listening for the responsive event) and the virtual assistant application 108 can take any of a number of different actions based upon receipt of the responsive data event. In some embodiments, the virtual assistant application 108 inserts (step 214) one or more messages comprising the session context data elements into the chat-based communication session with remote computing device 102. As shown in FIG. 3B, the first message 316 in the virtual assistant application includes the search phrase "What is a 529 plan?" provided from the parent software application as described above. The virtual assistant application 108 can automatically generate this message including the session context data upon initialization of the VA and/or upon reaching a specific session context workflow node in the chat-based communication session.

For example, in some embodiments the virtual assistant application 108 can initially connect to a chatbot or other automated conversation service application (e.g., hosted by remote computing device 102) to provide initial answers in response to the session context. The chatbot can utilize a preconfigured session context workflow (or dialog workflow) that intelligently interacts with the user and formulates responses to the user's chat messages (intents). The chatbot can utilize the session context data to advance to a particular portion of the session context workflow that is more customized to answer the user's specific request. In the event that the chatbot is not equipped to respond correctly or completely, the virtual assistant application 108 can transfer the chat-based communication session to a live agent (e.g., at remote computing device 102 and/or another device) and provide the session context data (including any additional context gathered by the chatbot) so that the live agent can quickly determine details about the user's request and respond more efficiently.

Once the message(s) containing the session context are provided in the virtual assistant application during the chat-based communication session, the user at computing device 106 and live agent at computing device 102 can conduct a typical chat-based communication session by entering messages in an appropriate input box 318 and submitting them for transmission to the other user. Once the chat session has concluded, the user at computing device 106 can select the End Chat button 320 to close the virtual assistant application 108.

Figure 4:
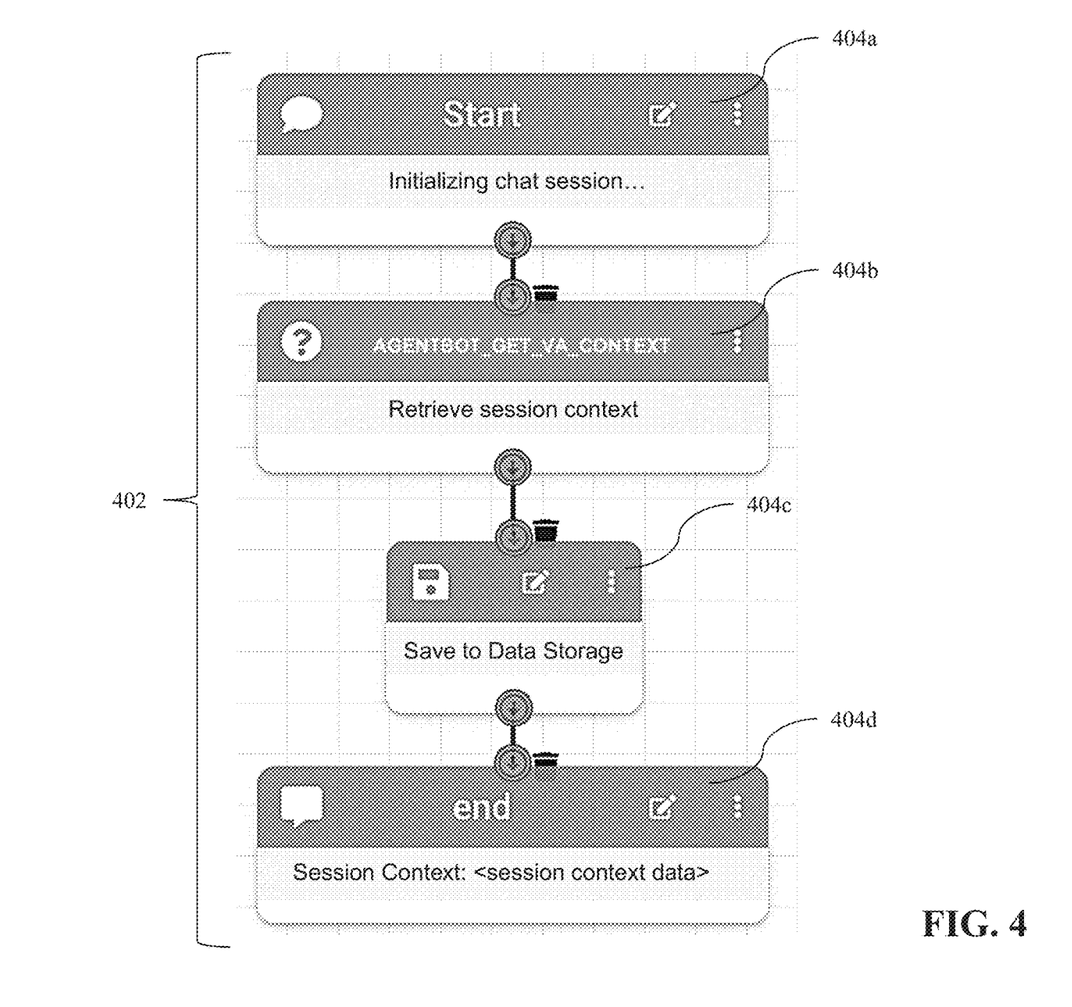
FIG. 4 is a screenshot of a user interface for configuring session context workflows used in chat-based communication sessions.

As can be appreciated, the system 100 can include functionality that enables users to create session context workflows using a dynamic and intuitive user interface. FIG. 4 is a screenshot of a user interface for configuring session context workflows used in chat-based communication sessions. As shown in FIG. 4, the user can create a session context workflow 402 comprised of a plurality of nodes 404a-404d connected to each other in a workflow that defines the intents, responses, data captures, and other elements of the virtual assistant application 108 session context capture. For example, node 404a can comprise a message for insertion in the virtual assistant application (i.e. "Initializing chat session . . . "). Following the arrow to node 404b, the virtual assistant application 108 then raises a data event requesting session context from the parent software application 112. When executed by the virtual assistant application 108, this node generates a first data event (e.g., AGENTBOT_VA_GET_CONTEXT) for the event manager 110 to relay to the parent software application as described above. Upon receiving the second data event from the parent software application 112, the virtual assistant application 108 can store the session context data elements to data storage area (node 404c) and then insert the session context data elements in a message to be included in the chat session (node 404d). As can be appreciated, the user interface functionality described in FIG. 4 is highly user-friendly, enabling developers to simply drag, drop and connect nodes in a workflow arrangement to suit any number of different business use cases or virtual assistant requirements.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for capturing and utilizing context data in virtual assistant communication sessions, the system comprising a computing device having a memory that stores computer-executable instructions and a processor that executes the computer-executable instructions to:
    establish a chat-based communication session between a virtual assistant application of the computing device and a remote computing device, the virtual assistant application associated with a parent software application and each of the virtual assistant application and the parent software application coupled to an event manager, the chat-based communication session associated with a session context workflow;
    listen for and capture, by the event manager, a first data event generated by the virtual assistant application during the chat-based communication session, the first data event comprising a plurality of attributes including an event type, a payload, and a callback function;
    determine, by the event manager, that the parent software application is subscribed to receive the first data event based upon a register maintained by the event manager;
    receive, by the parent software application, the first data event from the event manager,
    execute, by the parent software application, the callback function of the first data event to select one or more session context data elements, wherein at least one of the session context data elements are not visible to a user of the computing device;
    listen for and capture, by the event manager, a second data event generated by the parent software application, the second data event comprising a plurality of attributes including an event type, a payload comprising the selected session context data elements, and an indicator that denotes the second data event is associated with the first data event;
    determine, by the event manager, that the virtual assistant application is subscribed to receive the second data event based upon the register maintained by the event manager;
    receive, by the virtual assistant application, the second data event from the event manager;
    advance, by the virtual assistant application, the chat-based communication session to a different portion of the session context workflow based upon the session context data elements in the second data event; and
    insert, by the virtual assistant application, one or more messages comprising at least a portion of the session context data elements from the second data event into the chat-based communication session.

2. The system of claim 1, wherein the payload of the first data event comprises an identifier associated with the chat-based communication session.

3. The system of claim 1, wherein the attributes of the first data event include a timeout value and the virtual assistant application generates a timeout error when the second data event is not received before the timeout value elapses.

4. The system of claim 1, wherein the virtual assistant application and the event manager are embedded in the parent software application.

5. The system of claim 4, wherein the virtual assistant application is a text chat application, the event manager is a JavaScript application, and the parent software application is a browser application.

6. The system of claim 5, wherein the virtual assistant application and the event manager are embedded in a webpage of the parent software application.

7. The system of claim 1, wherein the virtual assistant application generates the first data event upon initializing the chat-based communication session.

8. The system of claim 1, wherein the virtual assistant application stores at least a portion of the session context data elements received in the second data event in one or more session storage parameters.

9. The system of claim 8, wherein the virtual assistant application clears the session storage parameters when the chat-based communication session is closed.

10. The system of claim 1, wherein the session context workflow is displayed as a workflow diagram in a graphical user interface on a second computing device and one or more users of the second computing device modify the session content workflow using one or more input devices of the second computing device.

11. The system of claim 1, wherein the parent software application:
    receives a third data event from the event manager, the third data event comprising a plurality of attributes including an event type, a callback function, and an indicator that the chat-based communication session has been established; and
    executes the callback function of the third data event to (i) activate one or more user interface elements of the parent software application; (ii) deactivate one or more user interface elements of the parent software application; or (iii) both.

12. The system of claim 11, wherein the virtual assistant application generates the third data event upon initializing the chat-based communication session and transmits the third data event to the event manager.

13. A computerized method of capturing and utilizing context data in virtual assistant communication sessions, the method comprising:
    establishing a chat-based communication session between a virtual assistant application of the computing device and a remote computing device, the virtual assistant application associated with a parent software application and each of the virtual assistant application and the parent software application coupled to an event manager, the chat-based communication session associated with a session context workflow;
    listening for and capturing, by the event manager, a first data event generated by the virtual assistant application during the chat-based communication session, the first data event comprising a plurality of attributes including an event type, a payload, and a callback function;
    determining, by the event manager, that the parent software application is subscribed to receive the first data event based upon a register maintained by the event manager;
    receiving, by the parent software application, the first data event from the event manager;
    executing, by the parent software application, the callback function of the first data event to select one or more session context data elements, wherein at least one of the session context data elements are not visible to a user of the computing device;
    listening for and capturing, by the event manager, a second data event generated by the parent software application, the second data event comprising a plurality of attributes including an event type, a payload comprising the selected session context data elements, and an indicator that denotes the second data event is associated with the first data event;

determining, by the event manager, that the virtual assistant application is subscribed to receive the second data event based upon the register maintained by the event manager;

receiving, by the virtual assistant application, the second data event from the event manager;

advancing, by the virtual assistant application, the chat-based communication session to a different portion of the session context workflow based upon the session context data elements in the second data event; and inserting, by the virtual assistant application, one or more messages comprising at least a portion of the session context data elements from the second data event into the chat-based communication session.

14. The method of claim 13, wherein the payload of the first data event comprises an identifier associated with the chat-based communication session.

15. The method of claim 13, wherein the attributes of the first data event include a timeout value and the virtual assistant application generates a timeout error when the second data event is not received before the timeout value elapses.

16. The method of claim 13, wherein the virtual assistant application and the event manager are embedded in the parent software application.

17. The method of claim 16, wherein the virtual assistant application is a text chat application, the event manager is a JavaScript application, and the parent software application is a browser application.

18. The method of claim 17, wherein the virtual assistant application and the event manager are embedded in a webpage of the parent software application.

19. The method of claim 13, wherein the virtual assistant application generates the first data event upon initializing the chat-based communication session.

20. The method of claim 13, wherein the virtual assistant application stores at least a portion of the session context data elements received in the second data event in one or more session storage parameters.

21. The method of claim 20, wherein the virtual assistant application clears the session storage parameters when the chat-based communication session is closed.

22. The method of claim 13, wherein the session context workflow is displayed as a workflow diagram in a graphical user interface on a second computing device and one or more users of the second computing device modify the session content workflow using one or more input devices of the second computing device.

23. The method of claim 13, further comprising:

receiving, by the parent software application, a third data event from the event manager, the third data event comprising a plurality of attributes including an event type, a callback function, and an indicator that the chat-based communication session has been established; and executing, by the parent software application, the callback function of the third data event to (i) activate one or more user interface elements of the parent software application; (ii) deactivate one or more user interface elements of the parent software application; or (iii) both.

24. The system of claim 23, wherein the virtual assistant application generates the third data event upon initializing the chat-based communication session and transmits the third data event to the event manager.

* * * * *